(12) United States Patent
Hiei et al.

(10) Patent No.: US 8,768,575 B2
(45) Date of Patent: Jul. 1, 2014

(54) VEHICLE PERIPHERY MONITORING DEVICE

(75) Inventors: Yu Hiei, Toyota (JP); Ryuji Okamura, Toyota (JP); Yuka Sobue, Nagoya (JP); Chika Yoshioka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/508,861

(22) PCT Filed: Mar. 18, 2011

(86) PCT No.: PCT/JP2011/056602
§ 371 (c)(1),
(2), (4) Date: May 9, 2012

(87) PCT Pub. No.: WO2012/127576
PCT Pub. Date: Sep. 27, 2012

(65) Prior Publication Data
US 2014/0012464 A1    Jan. 9, 2014

(51) Int. Cl.
*B60R 11/04*    (2006.01)
*G06T 3/20*    (2006.01)
*G06T 3/40*    (2006.01)

(52) U.S. Cl.
CPC . *B60R 11/04* (2013.01); *G06T 3/20* (2013.01); *G06T 3/40* (2013.01); *B60R 2300/306* (2013.01); *B60R 2300/8026* (2013.01)
USPC .......................................... 701/49; 348/148

(58) Field of Classification Search
CPC .. B60R 1/00; B60R 1/002; B60R 2001/1253; B60R 2300/105; B60R 2300/303; B60R 2300/306; G06T 3/4038
USPC .......................................... 701/36; 348/148
See application file for complete search history.

(56) References Cited

U.S. PATENT DOCUMENTS 6,593,960 B1 *  7/2003  Sugimoto et al. ............. 348/148
7,161,616 B1 *  1/2007  Okamoto et al. ............. 348/148
7,576,767 B2 *  8/2009  Lee et al. ........................ 348/36

(Continued)

FOREIGN PATENT DOCUMENTS

| JP | A-06-227318 | 8/1994 |
|---|---|---|
| JP | A-10-257482 | 9/1998 |
| JP | A-2003-081014 | 3/2003 |
| JP | A-2008-4990 | 1/2008 |

(Continued)

OTHER PUBLICATIONS

Jun. 7, 2011 International Search Report issued in International Patent Application No. PCT/JP2011/056602 (with translation).

*Primary Examiner* — John R Olszewski
*Assistant Examiner* — Todd Melton
(74) *Attorney, Agent, or Firm* — Oliff PLC

(57) ABSTRACT

The recognizability of a vehicle peripheral environment may be enhanced. A vehicle periphery monitoring device is to monitor the periphery of a vehicle. The vehicle periphery monitoring device includes an imaging unit that obtains a plurality of peripheral images by imaging the periphery of the vehicle, a display unit that displays the plurality of peripheral images imaged in the imaging unit, and an image control unit that controls the plurality of peripheral images displayed in the display unit. The image control unit varies a distance between the plurality of peripheral images displayed in the display unit. As a result, sensory understanding of a vehicle peripheral environment by a driver may be enhanced, thereby enhancing the recognizability of the vehicle peripheral environment.

7 Claims, 4 Drawing Sheets

(56) References Cited

U.S. PATENT DOCUMENTS

| | | | |
|---|---|---|---|
| 8,502,860 B2 * | 8/2013 | Demirdjian | 348/36 |
| 2008/0007428 A1 | 1/2008 | Watanabe et al. | |
| 2010/0208073 A1 | 8/2010 | Hattori | |

FOREIGN PATENT DOCUMENTS

| | | |
|---|---|---|
| JP | A-2008-15759 | 1/2008 |
| JP | A-2010-095086 | 4/2010 |
| JP | A-2010-188902 | 9/2010 |

* cited by examiner (a)

(b)

(a)

(b)

(a)

(b)

VEHICLE PERIPHERY MONITORING DEVICE

TECHNICAL FIELD

The present invention relates to a vehicle periphery monitoring device.

BACKGROUND ART

In the related art, as a vehicle periphery monitoring device for monitoring the periphery of a vehicle, a technology disclosed in, for example, Patent Literature 1 has been known. In the vehicle periphery monitoring device, an image corresponding to a vehicle peripheral environment that is reflected in an interior mirror or a side mirror may be displayed on a monitor, and when the vehicle travels at high-speed, a corresponding image may be enlarged.

CITATION LIST

Patent Literature

[Patent Literature 1] Japanese Unexamined Patent Application Publication No. 2010-095086

SUMMARY OF INVENTION

Technical Problem

Here, in recent years, as the above-described vehicle periphery monitoring device, there is a demand for enhancing the recognizability of a vehicle peripheral environment in a manner such that a driver can understand the state of obstacles, and the like around a vehicle in a sensory way.

Therefore, an object of the invention is to provide a vehicle periphery monitoring device which may enhance the recognizability of a vehicle peripheral environment.

Solution to Problem

According to an object of the invention, there is provided a vehicle periphery monitoring device for monitoring the periphery of a vehicle, including: an imaging unit that obtains a plurality of peripheral images by imaging the periphery of the vehicle; a display unit that displays the plurality of peripheral images imaged in the imaging unit; and an image control unit that controls the plurality of peripheral images displayed in the display unit, wherein the image control unit varies a distance between the plurality of peripheral images displayed in the display unit.

In the vehicle periphery monitoring device, sensory understanding of a vehicle peripheral environment by a driver may be enhanced by varying the distance between the plurality of peripheral images, thereby enhancing the recognizability of the vehicle peripheral environment.

In addition, it is preferable that the image control unit vary the distance between the plurality of peripheral images in accordance with a traveling situation of the vehicle. In this case, the recognizability of the vehicle peripheral environment that is suitable for the traveling situation of the vehicle may be enhanced.

In addition, it is preferable that the image control unit vary the distance between the plurality of peripheral images in accordance with an angle of view of the plurality of peripheral images. In this case, the recognizability of the vehicle peripheral environment may be enhanced in accordance with changes in the peripheral image such as a wide angle and a narrow angle in the angle of view, and the like.

In addition, it is preferable that the image control unit vary a balance between the angles of view of the plurality of peripheral images in accordance with a turning situation of the vehicle. In this case, monitoring of a direction in which entrainment is expected by an inner wheel difference or an outer wheel difference may be strengthened.

In addition, there is a case in which the plurality of peripheral images corresponds to a pair of vehicle peripheral environments reflected in a left side mirror and a right side mirror. Thus, the rear of the vehicle corresponding to the side mirrors may be easily monitored on the display unit.

Advantageous Effects of Invention

According to the present invention, it is possible to enhance the recognizability of the vehicle peripheral environment.

DESCRIPTION OF EMBODIMENTS

Figure 1:
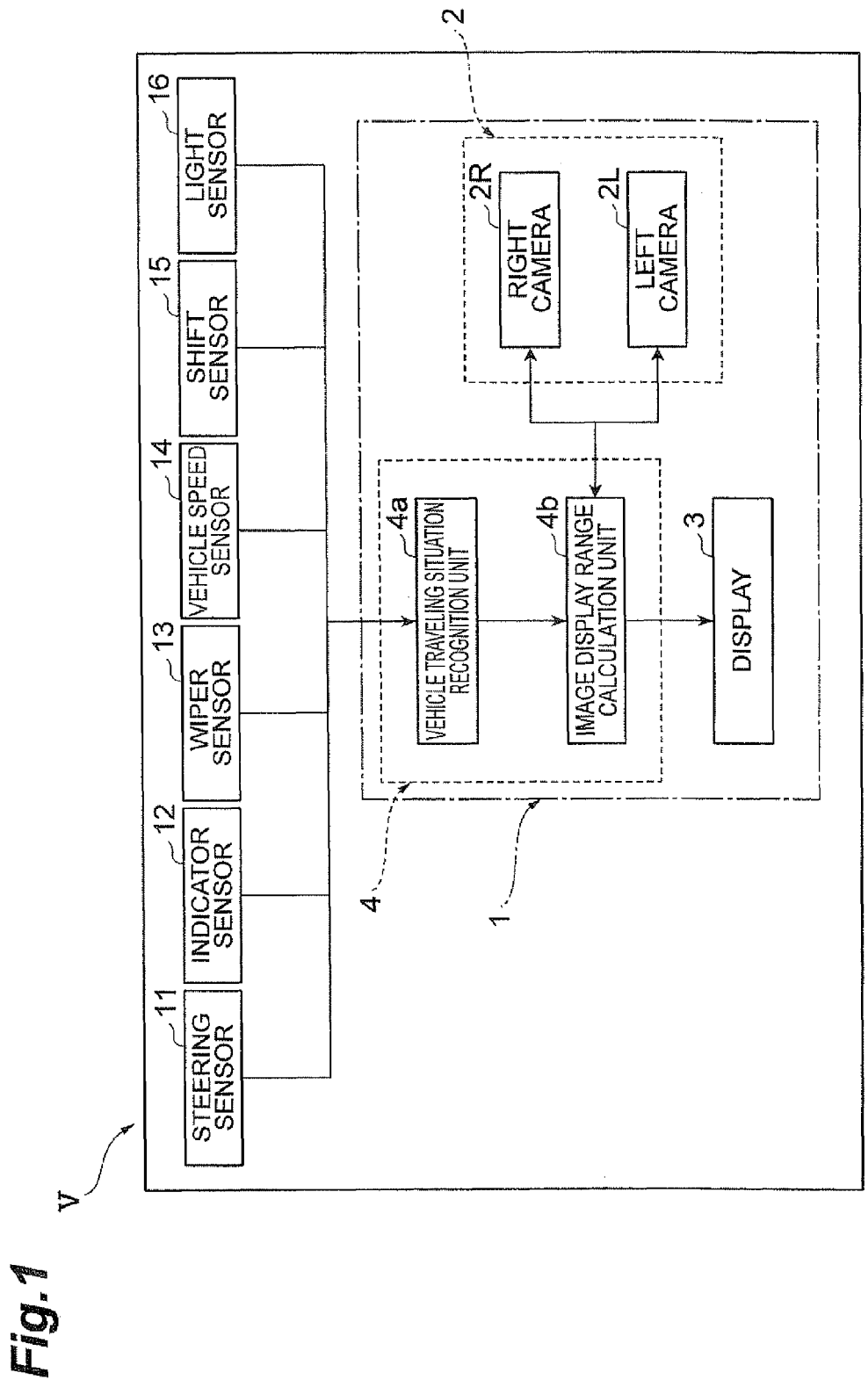
FIG. 1 is a schematic configuration view showing a vehicle periphery monitoring device according to an embodiment of the present invention.

Hereinafter, a preferred embodiment of the invention will be described in detail with reference to the accompanying drawings. In addition, in the following descriptions, the same or corresponding components are denoted by the same reference numerals, and repeated descriptions will be omitted.

Figure 2:
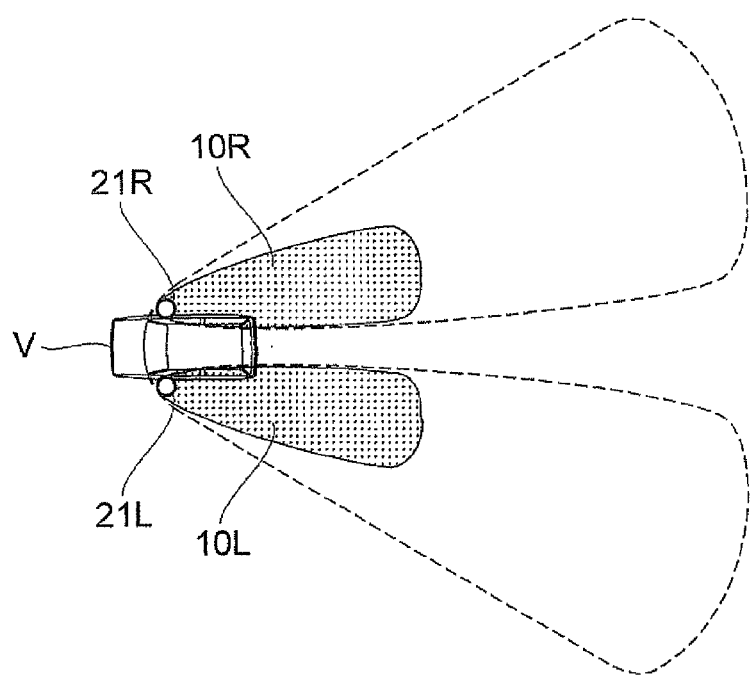
FIG. 2 (*a*) is a bird's eye view showing a vehicle for explaining an example of an operation in the vehicle periphery monitoring device of FIG. 1, and (*b*) is a view showing a display for explaining an example of an operation in the vehicle periphery monitoring device of FIG. 1.
Figure 2:
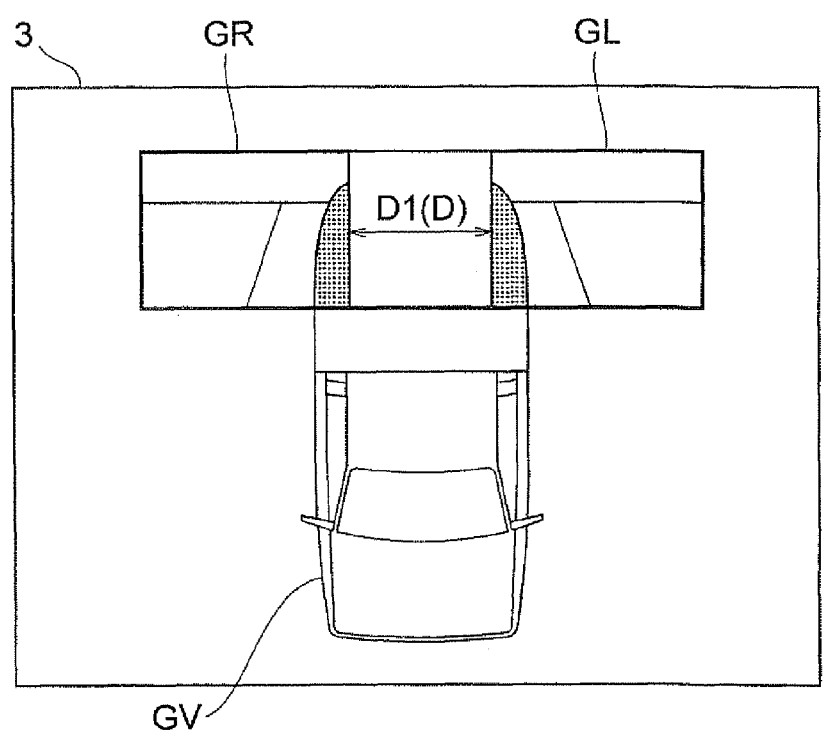
Figure 3:
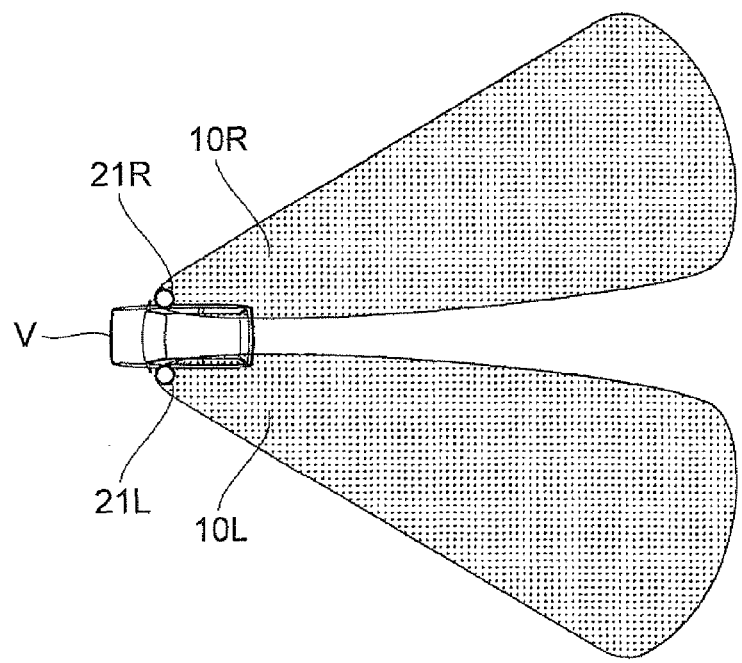
FIG. 3(*a*) is a bird's eye view showing a vehicle for explaining another example of an operation in the vehicle periphery monitoring device of FIG. 1, and (*b*) is a view showing a display for explaining another example of an operation in the vehicle periphery monitoring device of FIG. 1.
Figure 3:
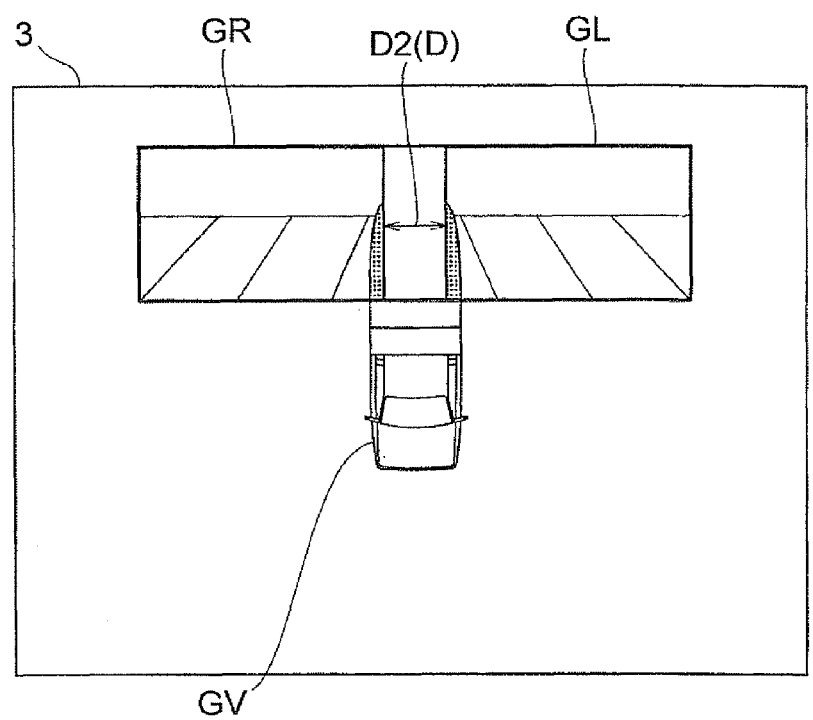
Figure 4:
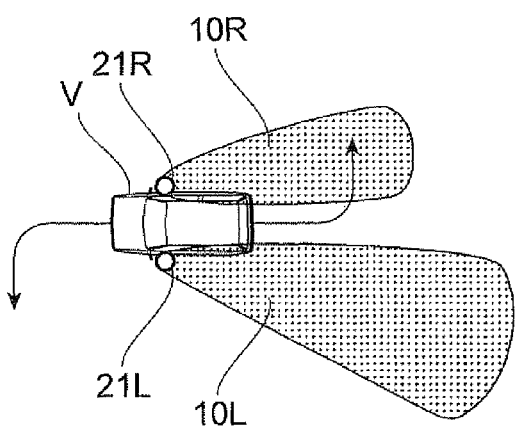
FIG. 4(*a*) is a bird's eye view showing a vehicle for explaining still another example of an operation in the vehicle periphery monitoring device of FIG. 1, and (*b*) is a view showing a display for explaining still another example of an operation in the vehicle periphery monitoring device of FIG. 1.
Figure 4:
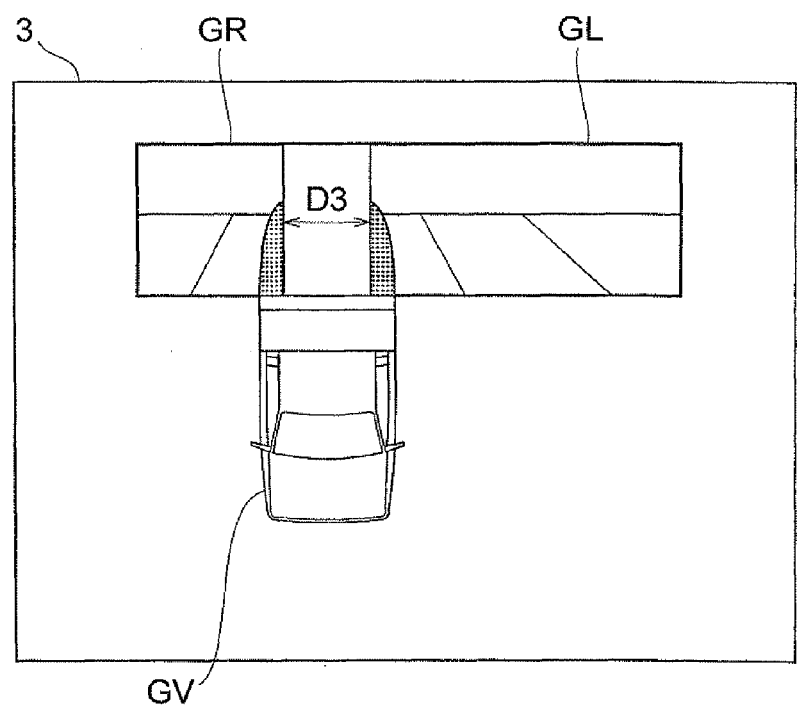

FIG. 1 is a schematic configuration view showing a vehicle periphery monitoring device according to an embodiment of the invention, and FIGS. 2 to 4 are explanatory views showing examples of operations of the vehicle periphery monitoring device of FIG. 1. As shown in FIGS. 1 and 2, the vehicle periphery monitoring device 1 according to the present embodiment is mounted to a vehicle V such as an automobile, and the like, and used so as to monitor the periphery of the vehicle. The vehicle periphery monitoring device 1 includes an imaging device (an imaging unit) 2, a display (a display unit) 3, and an image control device (an image control unit) 4.

The imaging device 2 obtains a plurality of peripheral images G by imaging the periphery of the vehicle V. The imaging device 2 includes a right camera 2R and a left camera 2L. The right camera 2R images a peripheral image GR of the right rear side of the vehicle as an image corresponding to a vehicle peripheral environment reflected on a right side mirror 21R. The right camera 2R is mounted on the right side of the vehicle (for example, the right side mirror 21R) so as to face rearward. The left camera 2L images a peripheral image GL of the left rear side of the vehicle as an image corresponding to the vehicle peripheral environment reflected on a left side mirror 21L. The left camera 2L is mounted on the left side of the vehicle (for example, the left side mirror 21L) so as to face rearward.

The right camera 2R and the left camera 2L are connected to the image control device 4. Thus, the right camera 2R and the left camera 2L output the imaged peripheral images GR and GL to the image control device 4. Together with that, in the right camera 2R and the left camera 2L, an angle of view (an imaging range is represented by an angle) of the plurality of imaged peripheral images GR and GL and an enlargement ratio thereof are varied by the image control device 4. As the right camera 2R and the left camera 2L, a variety of cameras may be used, and the right camera 2R and the left camera 2L are not particularly limited.

The display 3 displays the peripheral images GR and GL which are imaged by the imaging device 2. The display 3 is connected to the image control device 4. Thus, the display 3 displays the peripheral images GR and GL based on an input from the image control device 4, and displays a vehicle image GV corresponding to the vehicle V. As the display 3, a variety of displays (monitors) may be used, and the display 3 is not particularly limited.

The image control device 4 controls the peripheral images GR and GL which are displayed on the display 3. The image control device 4 is constituted of an ECU (Electronic Control Unit) including, for example, CPU, ROM, and RAM, etc. The image control device 4 includes a vehicle traveling situation recognition unit 4a for recognizing a traveling situation of the vehicle V, and an image display range calculation unit 4b for calculating an image display range.

The vehicle traveling situation recognition unit 4a is connected to a steering sensor 11, an indicator sensor 12, a wiper sensor 13, a vehicle speed sensor 14, a shift sensor 15, and a light sensor 16, and recognizes the traveling situation of the vehicle V based on sensor information that is input from these sensors.

In addition, the steering sensor 11 detects a steering situation. The indicator sensor 12 detects an operation situation of an indicator. The wiper sensor 13 detects an operation situation of a wiper. The vehicle speed sensor 14 detects a speed of the vehicle V. The shift sensor 15 detects a shift situation (a shift gear) of the vehicle V. The light sensor 16 detects an operation situation of a headlight of the vehicle V.

The image display range calculation unit 4b varies a size and a position of each of the vehicle image GV and the peripheral images GR and GL on the display 3, the angle of view of the peripheral images GR and GL, and the enlargement ratio thereof. In addition, the image display range calculation unit 4b at least varies a distance D between the plurality of peripheral images GR and GL displayed on the display 3 (for more detail, see below).

In the vehicle periphery monitoring device 1 configured as above, first, a traveling situation of the vehicle V is recognized based on the input from each of the sensors 11 to 16, by the vehicle traveling situation recognition unit 4a.

Specifically, based on the input from the steering sensor 11, the indicator sensor 12, the vehicle speed sensor 14, and the shift sensor 15, whether a traveling of the vehicle V is a street traveling, a high-speed traveling having a narrow effective visual field, a turning traveling such as turning right or turning left at a crossing (entrainment traveling), or a parking traveling for parking is recognized. Based on the input from the wiper sensor 13, whether the vehicle traveling of the vehicle V is traveling on a rainy day or not is recognized. Based on the input from the light sensor 16, whether the vehicle traveling of the vehicle V is traveling in daytime or traveling at night is recognized.

Subsequently, when the vehicle traveling is the street traveling, the parking traveling, the traveling on a rainy day, or the traveling at night, the following operation is performed by the image display range calculation unit 4b. That is, as shown in FIGS. 2(a) and 2(b), the peripheral images GR and GL having a high enlargement ratio and a narrow angle of view (a narrow angle), that is, the peripheral images GR and GL which show left and right rear sides of the vehicle V in narrow ranges 10R and 10L are arranged on the left and right sides to thereby be displayed in such a manner as to be separated from each other by a predetermined distance D on the display 3.

Specifically, as shown in FIG. 2(b), the vehicle image GV is displayed large on the display 3. Together with that, on a position corresponding to the right rear side of the vehicle image GV, the peripheral image GR having the high enlargement ratio and the narrow angle of view is displayed. In addition, on a position corresponding to the left rear side of the vehicle image GV, the peripheral image GL having the high enlargement ratio and the narrow angle of view is displayed. Next, it is assumed that the distance D between the peripheral images GR and GL is a distance D1 larger than a distance D2 and a distance D3 which will be described later. In other words, the plurality of peripheral images GR and GL is displayed in such a manner as to be separated from each other by the distance D1, so that the plurality of peripheral images is arranged on the left and right sides while having a large space therebetween.

Meanwhile, when the vehicle traveling is the high-speed traveling or the turning traveling, the following operation is performed by the image display range calculation unit 4b. That is, as shown in FIGS. 3(a) and 3(b), the peripheral images GR and GL having a low enlargement ratio and a wide angle of view (a wide angle), that is, the peripheral images GR and GL which show left and right rear sides of the vehicle V in wide ranges 10R and 10L are arranged on the left and right sides to thereby be displayed in such a manner as to be separated from each other by a predetermined distance D on the display 3.

Specifically, as shown in FIG. 3(b), the vehicle image GV is displayed small on the display 3. Together with that, on a position corresponding to the right rear side of the vehicle image GV, the peripheral image GR having the low enlargement ratio and the wide angle of view is displayed. In addition, on a position corresponding to the left rear side of the vehicle image GV, the peripheral image GL having the low enlargement ratio and the wide angle of view is displayed.

Next, it is assumed that the distance D between the peripheral images GR and GL is a distance D2 smaller than the distance D1 and a distance D3 which will be described later. In other words, the plurality of peripheral images GR and GL is displayed in such a manner as to be separated from each other by the distance D2, so that the plurality of peripheral images is arranged on the left and right sides while having a small space therebetween.

On the other hand, when the vehicle traveling is the turning traveling or the parking traveling, and an inner wheel difference between tracks followed by front and back inner wheels or an outer wheel difference between tracks followed by front and back outer wheels is generated, the following operation is performed by the image display range calculation unit 4b. That is, as shown in FIGS. 4(a) and 4(b), the peripheral images GR and GL having an enlargement ratio equal to each other and angles of view different from each other, that is, the peripheral images GR and GL which show the left and right rear sides of the vehicle V in ranges 10R and 10L different from each other are arranged on the left and right sides to thereby be displayed in such a manner as to be separated from each other by a predetermined distance D on the display 3.

For example, when the vehicle traveling is a left-turning traveling or the traveling of reversing right as shown in FIG. 4(b), the vehicle image GV is displayed with a usual size on a position that is shifted leftward from a center in a right and left direction on the display 3. Together with that, on a position corresponding to the right rear side of the vehicle image GV, the peripheral image GR having a usual enlargement ratio and a narrow angle of view is displayed. In addition, on a position corresponding to the left rear side of the vehicle image GV, the peripheral image GL having a usual enlargement ratio and a wide angle of view is displayed. In other words, one of the peripheral side images in which an inner wheel difference or an outer wheel difference of the vehicle V is generated, from among the plurality of peripheral images GR and GL, is displayed in a wide range. Next, it is assumed that the distance D between the peripheral images GR and GL is a distance D2 which is smaller than the first distance D1 and larger than the distance D3.

As described above, in the vehicle periphery monitoring device 1 according to the present embodiment, by varying the distance D between the peripheral images GR and GL which strongly affects the easiness to recognize the vehicle peripheral environment, sensory understanding of the vehicle peripheral environment by a driver may be enhanced, thereby enhancing the recognizability of the vehicle peripheral environment. As a result, in the present embodiment, when the rear side of the vehicle is displayed using a plurality of cameras 2R and 2L, the distance D between the peripheral images GR and GL due to each of the cameras 2R and 2L is determined taking the vehicle V into consideration, so that it is possible to easily recognize the vehicle peripheral environment.

In particular, in the present embodiment, as described above, the distance D between the peripheral images OR and GL is varied in accordance with the traveling situation of the vehicle V. As a result, the recognizability of the vehicle peripheral environment that is suitable for the traveling situation of the vehicle V may be enhanced. In addition, the vehicle peripheral environment may be recognized by taking into account the traveling situation of the vehicle V, so that it is possible to suppress misrecognition of the vehicle peripheral environment.

In addition, in the present embodiment, as described above, the distance D between the peripheral images GR and GL is varied in accordance with the angle of view and the enlargement ratio of the peripheral images GR and GL. As a result, the recognizability of the vehicle peripheral environment may be enhanced in accordance with the changes in the peripheral images GR and GL such as a wide angle and a narrow angle in the angle of view, and the like. Therefore, the sensory understanding of the vehicle peripheral environment by the driver may be further enhanced, so that it is possible to intuitively recognize a relative size between a display object and the vehicle V.

In addition, according to the present embodiment, as described above, the peripheral images GR and GL correspond to (equivalent to) a pair of vehicle peripheral environments reflected in the right side mirror 21 R and the left side mirror 21L, so that it is possible to easily monitor the rear side corresponding to the side mirrors 21 R and 21L on the display 3.

In addition, as described above, for example, at the time of the street traveling or the parking traveling, the peripheral images GR and GL are enlarged and displayed, and the distance D between the peripheral images GR and GL is assumed to be the wide distance D1. As a result, it is possible to suitably grasp a white line or a positional relationship between adjacent vehicles, etc. In addition, for example, even at the time of the traveling on a rainy day or the traveling at night, the peripheral images GR and GL are enlarged and displayed, and the distance D between the peripheral images GR and GL is assumed to be the wide distance D1. As a result, it is possible to suppress misrecognition of the vehicle peripheral environment due to poor visibility.

In addition, in the present embodiment, as described above, at the time of the turning traveling or the high-speed traveling, the enlargement ratio of the peripheral images GR and GL is reduced to display the periphery of the vehicle wide by reducing the vehicle image GV, and the distance D between the peripheral images GR and GL is assumed to be the narrow distance D2. As a result, it is possible to effectively recognize the periphery of the vehicle V.

In addition, in the present embodiment, as described above, when the inner wheel difference or the outer wheel difference is generated at the time of the turning traveling or the parking traveling, the angle of view of each of the peripheral images GR and GL is changed taking the inner wheel difference or the outer wheel difference into consideration (the display range is shifted). That is, a balance between the angles of view of the peripheral images GR and GL is varied in accordance with the turning situation of the vehicle V. As a result, it is possible to effectively recognize information required at the time of turning, and to strengthen monitoring of a direction in which entrainment is expected by the inner wheel difference or the outer wheel difference. In addition, in this case, the enlargement ratios of the peripheral images GR and GL are equal to each other, so that it is possible to suppress the sense of incongruity even though the angles of view of the peripheral images GR and GL are different from each other.

As above, a preferred embodiment of the invention has been described; however, the invention is not limited to the vehicle periphery monitoring device 1 of the above-described embodiment. The invention can be modified within the range which does not constitute departure from the sprit and the scope of the invention as set forth in the appended claims, or can be applied to others.

For example, a display space on the display 3 may be secured without displaying the vehicle image GV on the display 3. In this case, it is possible to suitably display other information such as alert and navigation information, etc. In addition, by appropriately switching on and off of the display of the vehicle image GV, it is possible to effectively confirm the vehicle peripheral environment while appropriately obtaining a display space of other information such as alert and navigation information, etc.

REFERENCE SIGNS LIST 1 vehicle periphery monitoring device
2 imaging device (imaging unit)
3 display (display unit)
4 image control device (image control unit)
21R, 21L side mirrors
D, D1, D2, D3 distances between peripheral images
G, GR, GL peripheral image
V vehicle

The invention claimed is:

1. A vehicle periphery monitoring device for monitoring the periphery of a vehicle, comprising:
   an imaging unit that obtains a plurality of peripheral images including a peripheral image of a left rear side of the vehicle and a peripheral image of a right rear side of the vehicle by imaging the periphery of the vehicle;
   a display unit that displays the plurality of peripheral images imaged in the imaging unit separately from one another without synthesis; and
   an image control unit that controls the plurality of peripheral images displayed in the display unit,
   wherein the image control unit varies a distance between the peripheral image of the left rear side of the vehicle and the peripheral image of the right rear side of the vehicle which are displayed adjacent to each other on the display unit, and an angle of view in each of the peripheral image of the left rear side of the vehicle and the peripheral image of the right rear side of the vehicle,
   the distance between the peripheral image of the left rear side of the vehicle and the peripheral image of the right rear side of the vehicle is set as a first distance when each of the peripheral image of the left rear side of the vehicle and the peripheral image of the right rear side of the vehicle is a narrow angle, and
   the distance between the peripheral image of the left rear side of the vehicle and the peripheral image of the right rear side of the vehicle is set as a second distance smaller than the first distance when each of the peripheral image of the left rear side of the vehicle and the peripheral image of the right rear side of the vehicle is a wide angle.

2. The vehicle periphery monitoring device according to claim 1, wherein the image control unit varies the distance between the peripheral image of the left rear side of the vehicle and the peripheral image of the right rear side of the vehicle in accordance with a traveling situation of the vehicle.

3. The vehicle periphery monitoring device according to claim 2, wherein the image control unit varies a balance between the angles of view of the peripheral image of the left rear side of the vehicle and the peripheral image of the right rear side of the vehicle in accordance with a turning situation of the vehicle.

4. The vehicle periphery monitoring device according to claim 2, wherein the peripheral image of the left rear side of the vehicle and the peripheral image of the right rear side of the vehicle correspond to a pair of vehicle peripheral environments reflected in a left side mirror or a right side mirror.

5. The vehicle periphery monitoring device according to claim 1, wherein the image control unit varies a balance between the angles of view of the peripheral image of the left rear side of the vehicle and the peripheral image of the right rear side of the vehicle in accordance with a turning situation of the vehicle.

6. The vehicle periphery monitoring device according to claim 5, wherein the peripheral image of the left rear side of the vehicle and the peripheral image of the right rear side of the vehicle correspond to a pair of vehicle peripheral environments reflected in a left side mirror or a right side mirror.

7. The vehicle periphery monitoring device according to claim 1, wherein the peripheral image of the left rear side of the vehicle and the peripheral image of the right rear side of the vehicle correspond to a pair of vehicle peripheral environments reflected in a left side mirror or a right side mirror.

* * * * *